(12) United States Patent
Sakamoto et al.

(10) Patent No.: US 9,485,426 B2
(45) Date of Patent: Nov. 1, 2016

(54) MOVING PICTURE PROCESSING DEVICE FOR CONTROLLING MOVING PICTURE PROCESSING

(71) Applicant: CASIO COMPUTER CO., LTD., Shibuya-ku, Tokyo (JP)

(72) Inventors: Shohei Sakamoto, Tokyo (JP); Katsunori Tsutsumi, Tokyo (JP); Hiroyoshi Ogawa, Tokyo (JP); Jun Muraki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 264 days.

(21) Appl. No.: 14/028,237

(22) Filed: Sep. 16, 2013

(65) Prior Publication Data

US 2014/0078332 A1 Mar. 20, 2014

(30) Foreign Application Priority Data

Sep. 20, 2012 (JP) ................................ 2012-207373

(51) Int. Cl.
| | |
|---|---|
| *H04N 5/247* | (2006.01) |
| *H04N 5/04* | (2006.01) |
| *H04N 5/073* | (2006.01) |
| *H04N 5/92* | (2006.01) |
| *H04N 5/232* | (2006.01) |
| *H04N 5/93* | (2006.01) |

(52) U.S. Cl.
CPC ............ *H04N 5/23245* (2013.01); *H04N 5/04* (2013.01); *H04N 5/0733* (2013.01); *H04N 5/232* (2013.01); *H04N 5/247* (2013.01); *H04N 5/9205* (2013.01); *H04N 5/93* (2013.01)

(58) Field of Classification Search
CPC ..................... H04N 5/23245; H04N 13/0253; H04N 5/04; H04N 5/0733; H04N 5/247; H04N 5/9205; H04N 5/93
USPC ......................................... 348/220.1
See application file for complete search history.

(56) References Cited

U.S. PATENT DOCUMENTS

| | | | |
|---|---|---|---|
| 2003/0210329 A1* | 11/2003 | Aagaard et al. ............. | 348/159 |
| 2006/0125920 A1* | 6/2006 | Criminisi ............. | H04N 5/0733 348/159 |
| 2007/0070201 A1* | 3/2007 | Yokomitsu ............ | G06T 7/2033 348/169 |
| 2008/0143875 A1* | 6/2008 | Scott et al. .................... | 348/512 |

(Continued)

FOREIGN PATENT DOCUMENTS

| | | | | |
|---|---|---|---|---|
| JP | 2007-202957 A | | 8/2007 | |
| JP | 2008-199557 | * | 8/2008 | ............... H04N 7/15 |

(Continued)

OTHER PUBLICATIONS

Japanese Office Action dated Dec. 9, 2014, issued in counterpart Japanese Application No. 2012-207373.

*Primary Examiner* — Twyler Haskins
*Assistant Examiner* — Akshay Trehan
(74) *Attorney, Agent, or Firm* — Holtz, Holtz & Volek PC

(57) ABSTRACT

A moving picture processing device detects a predetermined feature point existing in a frame of a moving picture, identifies a position of the frame, in which a changing state of the detected feature point in the moving picture shows a predetermined changing state, and causes the predetermined changing state, as a condition to identify the position of the frame, to be common to other moving pictures.

19 Claims, 6 Drawing Sheets

(56) References Cited

U.S. PATENT DOCUMENTS

| | | | |
|---|---|---|---|
| 2008/0262718 A1* | 10/2008 | Farwell | 701/207 |
| 2009/0251601 A1* | 10/2009 | Ihlefeld | H04N 5/0733 348/521 |
| 2011/0063446 A1* | 3/2011 | McMordie | G06K 9/00255 348/159 |
| 2011/0205380 A1* | 8/2011 | Shirakawa | H04N 5/247 348/211.9 |
| 2012/0044327 A1* | 2/2012 | Horita | G01C 11/06 348/47 |
| 2012/0253201 A1* | 10/2012 | Reinhold | A61B 5/1113 600/473 |

FOREIGN PATENT DOCUMENTS

| | | |
|---|---|---|
| JP | 2008199557 A | 8/2008 |
| JP | 2009-071844 A | 4/2009 |
| JP | 2012-070336 A | 4/2012 |

* cited by examiner

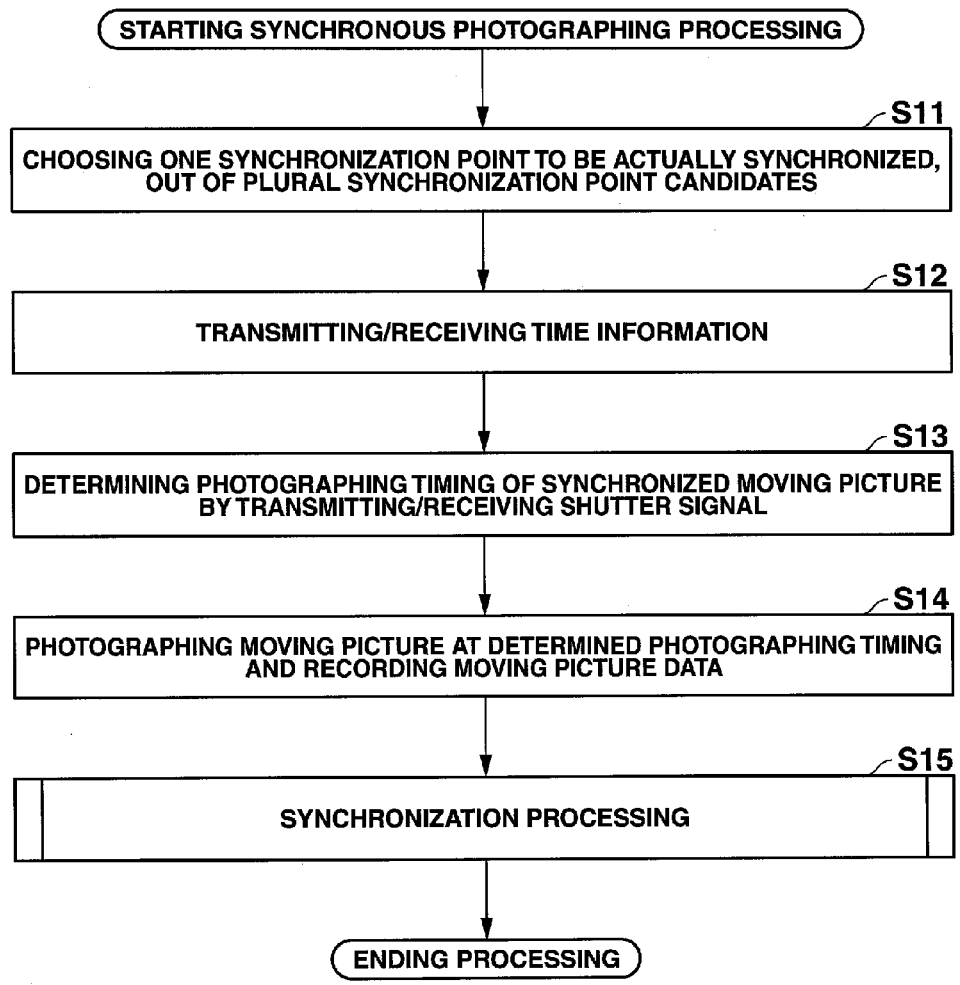

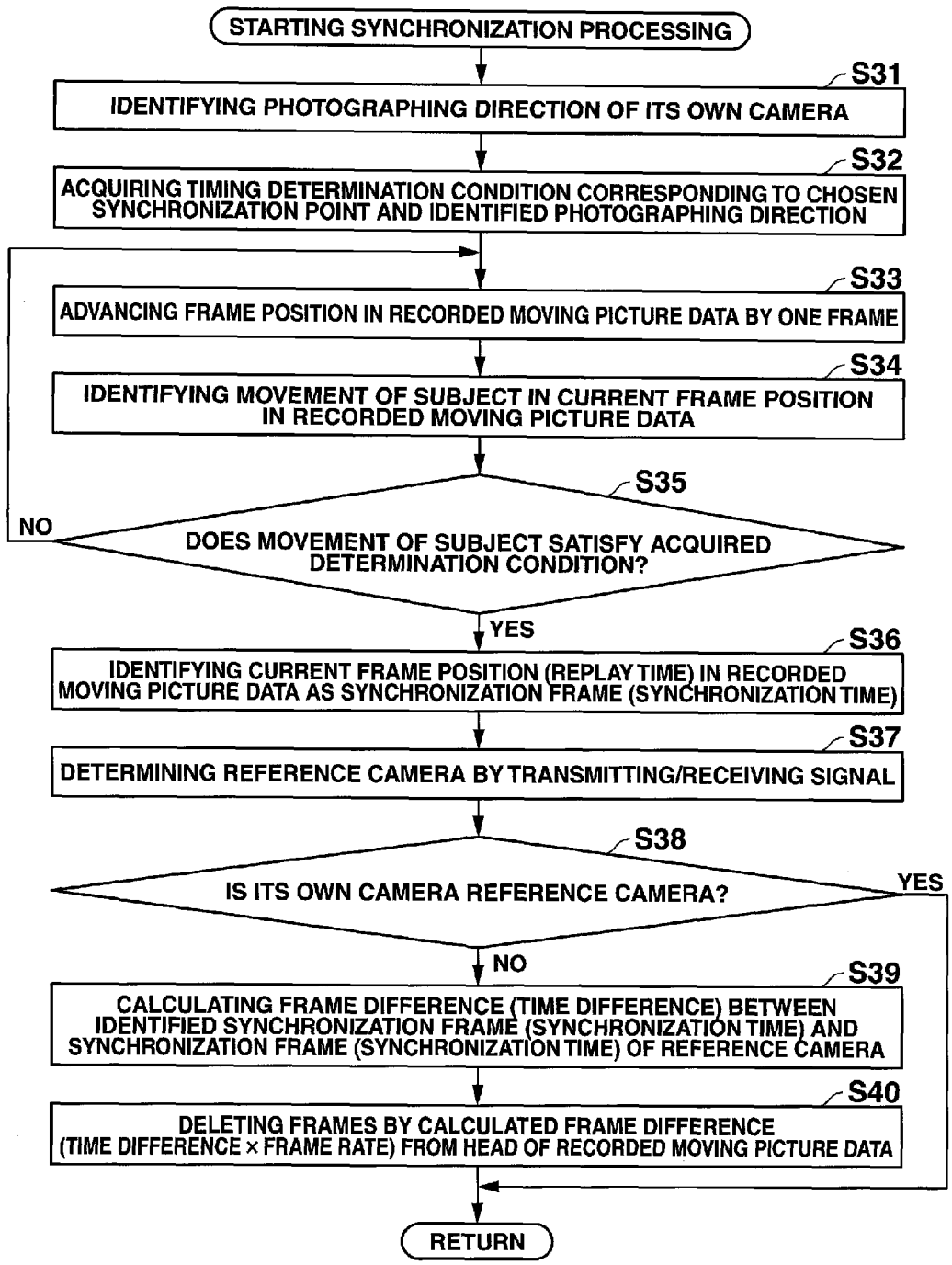

FIG.5

| SYNCHRONIZATION POINT CANDIDATES | TIMING DETERMINATION CONDITIONS FOR RESPECTIVE PHOTOGRAPHING DIRECTIONS ||||
| --- | --- | --- | --- | --- |
| | FRONT (FRONT OF BODY) | REAR (SIDE OF BODY) | OBLIQUE X-DEGREE DIRECTION | OBLIQUE Y-DEGREE DIRECTION |
| STARTING FROM ADDRESS POSITION | MOVING VECTOR OF HEAD CHANGES FROM STOPPING STATE TO VECTOR A | SIZE OF HEAD STARTS TO CHANGE SIGNIFICANTLY | (CONDITION OF CORRECTING VECTOR A IN THE LEFT BY X-DEGREE) | ... |
| MIDPOINT 1 | MOVING VECTOR OF HEAD CHANGES FROM VECTOR B TO VECTOR C | MOVING VECTOR OF HEAD CHANGES FROM VECTOR B' TO VECTOR C' | (CONDITION OF CORRECTING VECTORS B AND C IN THE LEFT BY X-DEGREE) | ... |
| TOP | MOVING VECTOR OF HEAD CHANGES FROM VECTOR C TO VECTOR D | SIZE OF HEAD DECREASES AND THEN STARTS TO INCREASE | (CONDITION OF CORRECTING VECTORS D AND E IN THE LEFT BY X-DEGREE) | ... |
| MIDPOINT 2 | MOVING VECTOR OF HEAD CHANGES FROM VECTOR E TO VECTOR F | MOVING VECTOR OF HEAD CHANGES FROM VECTOR E' TO VECTOR F' | ... | ... |
| IMPACT | MOVING VECTOR OF BALL CHANGES FROM STOPPING STATE TO VECTOR G | BALL IS COMPLETELY HIDDEN BY HEAD | ... | ... |
| MIDPOINT 3 | MOVING VECTOR OF HEAD CHANGES FROM VECTOR H TO VECTOR I | MOVING VECTOR OF HEAD CHANGES FROM VECTOR H' TO VECTOR I' | ... | ... |
| FOLLOW | MOVING VECTOR OF HEAD CHANGES FROM VECTOR J TO VECTOR K | MOVING VECTOR OF HEAD CHANGES FROM VECTOR J' TO VECTOR K' | ... | ... |

MOVING PICTURE PROCESSING DEVICE FOR CONTROLLING MOVING PICTURE PROCESSING

This application is based on and claims the benefit of priority from Japanese Patent Application No. 2012-207373, filed on 20 Sep. 2012, the content of which is incorporated herein by reference.

BACKGROUND OF THE INVENTION

1. Field of the Invention

The present invention relates to a moving picture processing device that controls predetermined moving picture processing, such as photographing of synchronized moving pictures, replay of the synchronized moving pictures and the like, or a moving picture processing method and a program (storage medium).

2. Related Art

As a method of simultaneously photographing moving pictures of an identical subject by using a plurality of photographing devices, a method of photographing the moving pictures, after synchronizing the photographing devices with each other via wire or wirelessly, has been used conventionally.

The photographing devices are synchronized with each other by a method of transmitting a shutter signal triggered by a start of moving picture photographing, or a method of transmitting information on a shutter time, as a time to start the moving picture photographing, after adjusting times of the photographing devices to each other by transmitting time information (refer to, for example, Japanese Unexamined Patent Application Publication No. 2012-70336).

SUMMARY OF THE INVENTION

According to an aspect of the present invention,
a moving picture processing device includes a feature point detection unit to detect a predetermined feature point existing in a frame of a moving picture,
a frame identification unit to identify a position of the frame, in which a changing state of the feature point detected by the feature point detection unit in the moving picture shows a predetermined changing state, and a synchronization control unit to cause the predetermined changing state, as a condition to identify the position of the frame by the frame identification unit, to be common to other moving pictures.

According to another aspect of the present invention,
a moving picture processing method includes the steps of feature point detection processing to detect a predetermined feature point existing in a frame of a moving picture, frame identification processing to identify a position of the frame, in which a changing state of the feature point detected by the feature point detection processing in the moving picture shows a predetermined changing state, and synchronization control processing to cause the predetermined changing state, as a condition to identify the position of the frame by the frame identification processing, to be common to other moving pictures.

According to still another aspect of the present invention,
a storage medium, in which a program, causing a computer of a moving picture processing device to function as:
a feature point detection unit to detect a predetermined feature point existing in a frame of a moving picture;
a frame identification unit to identify a position of the frame, in which a changing state of the feature point detected by the feature point detection unit in the moving picture shows a predetermined changing state; and
a synchronization control unit to cause the predetermined changing state, as a condition to identify the position of the frame by the frame identification unit, to be common to other moving pictures, is recorded therein.

BRIEF DESCRIPTION OF THE DRAWINGS

FIG. 3 is a flowchart showing the flow of the synchronous photographing processing executed by the image capturing and replaying control device shown in FIG. 1;

FIG. 4 is a flowchart showing the flow of synchronization processing executed by the image capturing and replaying control device;

FIG. 5 is a view showing a timing determination condition table stored in a storage unit in FIG. 1.

DETAILED DESCRIPTION OF THE INVENTION

First Embodiment

Hereinafter, a first embodiment of the present invention will be explained with reference to the drawings.

[Hardware Configuration]

Figure 1:
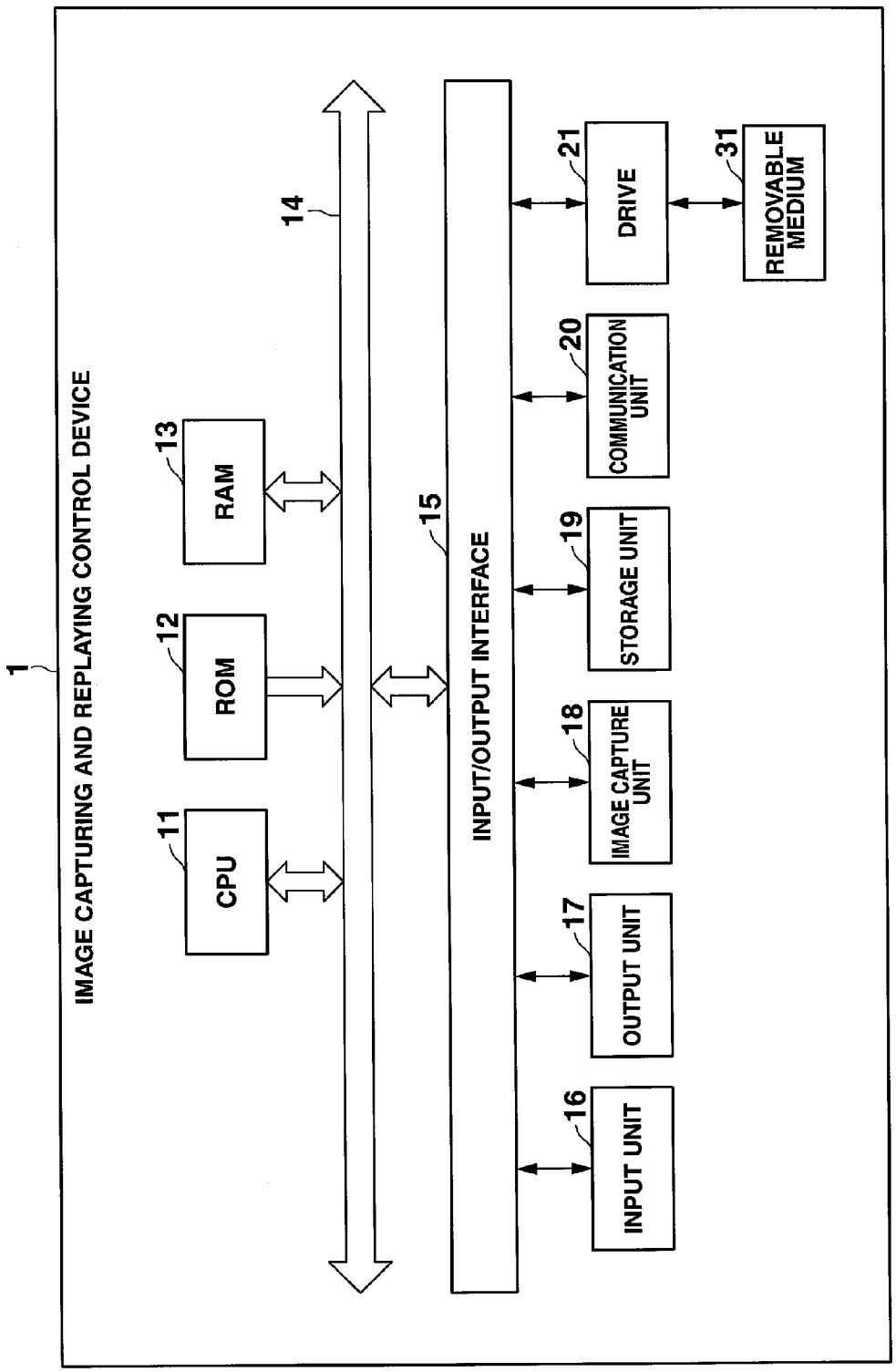
FIG. 1 is a block diagram showing hardware configuration of an image capturing and replaying control device.

FIG. 1 is a block diagram showing hardware configuration of an image capturing and replaying control device 1 according to an embodiment of the present invention.

The image capturing and replaying control device 1 is composed of a digital camera, for example.

According to the image capturing and replaying control device 1 of this embodiment, a feature point is detected from moving pictures, the images of which are respectively captured by two cameras, a change of the detected feature point in a moving direction or a change in luminance is detected, and unit images, in which the change is detected, are regarded as the unit images of the same time, so that synchronous photographing is executed by a plurality of cameras with high accuracy.

The unit image is an image that serves as a processing unit of the moving picture, which may be a field or a frame, for example. According to this embodiment, the frame is used as the unit image.

The image capturing and replaying control device 1 is provided with a CPU (Central Processing Unit) 11, ROM (Read Only Memory) 12, RAM (Random Access Memory) 13, a bus 14, an input/output interface 15, an input unit 16, an output unit 17, an image capture unit 18, a storage unit 19, a communication unit 20, and a drive 21.

The CPU 11 executes various processing according to programs recorded in the ROM 12, such as a later-described program for synchronous photographing processing, or programs loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The input unit 16 is constituted by various buttons, a pointing device or the like, and inputs various information such as choice of a synchronization point to be synchronized, determination of a reference camera, determination of a reference moving picture and the like, according to instructing operation of a user.

The output unit 17 is constituted by a display, a speaker or the like, and outputs images and sounds.

The image capture unit 18 captures an image of a subject, and supplies a digital signal (image signal) of the image containing the image of the subject (hereinafter referred to as a "captured image") to the CPU 11. Here, the digital signal (image signal) of the captured image is referred to as "captured image data" as appropriate.

The storage unit 19 is configured by DRAM (Dynamic Random Access Memory) or the like, and stores data of various images.

The communication unit 20 controls communication with other cameras (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

[Functional Configuration]

Figure 2:
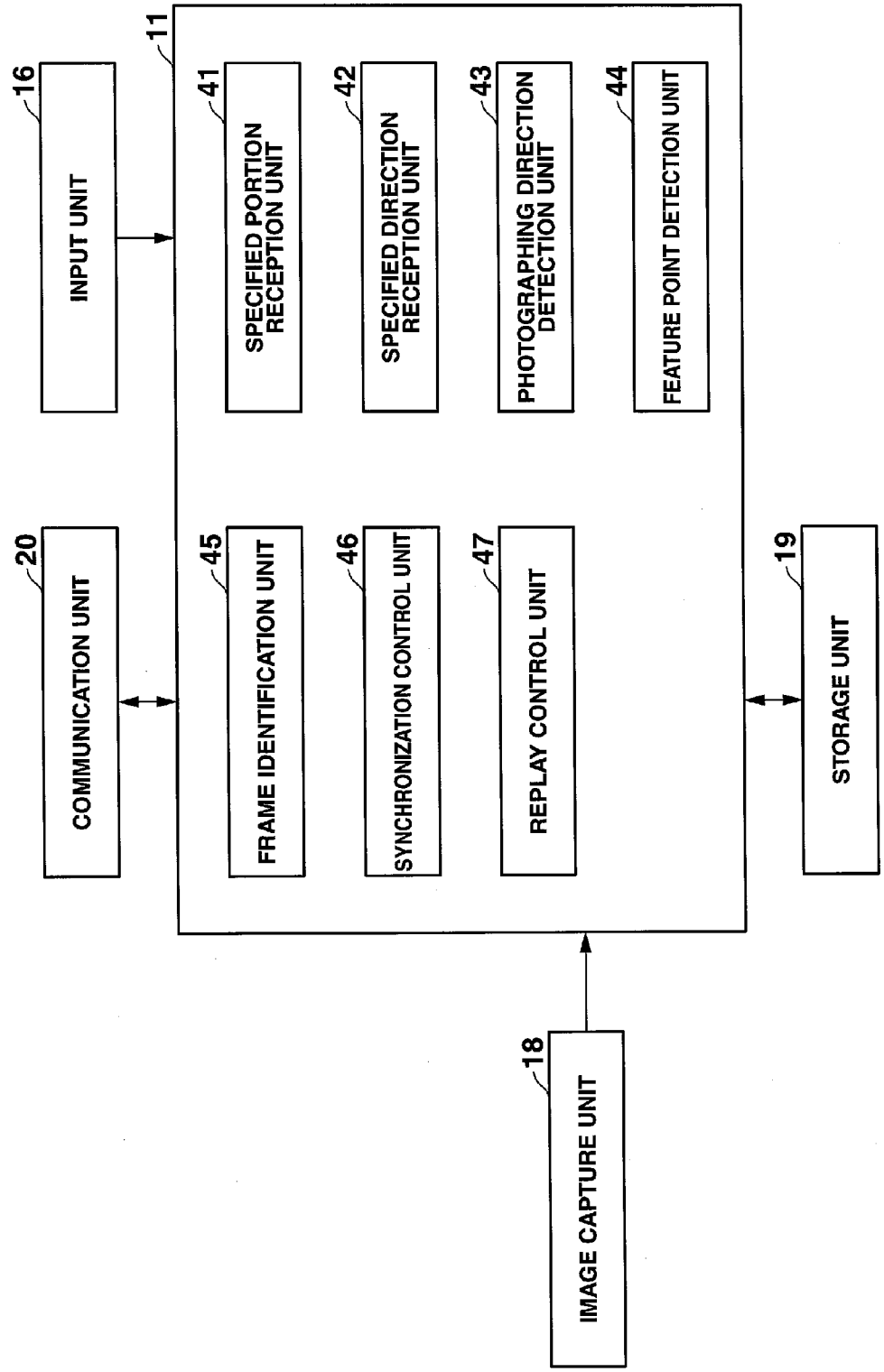
FIG. 2 is a functional block diagram showing functional configuration for executing synchronous photographing processing.

FIG. 2 is a functional block diagram showing functional configuration for executing the synchronous photographing processing, out of the functional configuration of the above-described image capturing and replaying control device 1.

The synchronous photographing processing means a processing sequence that determines timing of the moving picture photographing based on the chosen synchronization point, executes the synchronous photographing based on the determined synchronization timing, and executes synchronization processing.

The synchronization processing means a processing sequence for the synchronous photographing that determines synchronization frames in the moving pictures photographed by the respective cameras (image capturing and replaying control devices), according to whether a movement of the subject satisfies an acquired determination condition or not, and deletes the frames based on a time difference between the respective synchronization frames.

The CPU 11 is provided with a specified portion reception unit 41, a specified direction reception unit 42, a photographing direction detection unit 43, a feature point detection unit 44, a frame identification unit 45, a synchronization control unit 46, and a replay control unit 47, as functional blocks to execute the synchronous photographing processing.

The specified portion reception unit 41 receives a portion of the subject that is freely specified by the user, as the feature point to be detected.

The specified direction reception unit 42 receives a moving direction that is freely specified by the user, as the moving direction of the feature point to be detected.

The photographing direction detection unit 43 detects a difference in photographing directions of the plurality of cameras that execute the synchronous photographing.

Further, the photographing direction detection unit 43 detects the photographing direction of the camera, relative to a direction of the subject.

The feature point detection unit 44 detects the feature point that commonly exists in the photographing frames of the respective cameras, when the synchronous photographing is executed by the plurality of cameras. Further, the feature point detection unit 44 determines the moving direction of the feature point to be detected, based on the photographing direction detected by the photographing direction detection unit 43. Furthermore, the feature point detection unit 44 detects the feature point that commonly exists in the frames of the respective moving pictures, when the plurality of moving pictures are replayed simultaneously.

In this case, the feature point detection unit 44 detects the feature point, by detecting light of an LED (Light Emitting Diode) that is provided at a portion to be detected of the subject. The LED provided at the portion to be detected is constituted by a blue LED, for example. Further, the feature point detection unit 44 detects the light of the LED that flashes at regular intervals as the feature point.

The frame identification unit 45 identifies positions of the photographing frames, having the same changing state of the feature point detected by the feature point detection unit 44, in the respective cameras. Further, the frame identification unit 45 identifies the photographing frames, having the same moving direction of the feature point or the same changing state in the moving direction, in the respective cameras. Furthermore, the frame identification unit 45 identifies the photographing frames, having the same changing state of the feature point in the moving direction, in the respective cameras.

Moreover, the frame identification unit 45 detects the common feature point and identifies the photographing frames having the same changing state, in a plurality of pieces of moving picture data that are recorded by the synchronous photographing by the plurality of cameras, according to a method that is different from the method of matching recording timing of the identified photographing frames. Further, the frame identification unit 45 determines the moving direction, along which the portion received by the specified portion reception unit 41 should be detected, based on the detected photographing direction of the camera. Furthermore, the frame identification unit 45 determines the moving direction of the feature point to be detected by the respective cameras, based on the moving direction received by the specified direction reception unit 42 and the photographing directions of the respective cameras. Further, the frame identification unit 45 identifies the positions of the photographing frames, having the same changing state of the feature point, in the respective cameras, based on the difference in the photographing directions detected by the photographing direction detection unit 43. Furthermore, the image capturing and replaying control device 1 detects the common feature point by the feature point detection unit 44, and identifies the frame having the same changing state by the frame identification unit 45, in a plurality of pieces of the moving picture data that are recorded by the synchronous photographing by the plurality of cameras according to any other method.

The synchronization control unit 46 uses the position information of the respective photographing frames that are identified by the frame identification unit 45, and controls to synchronize the plurality of moving pictures, photographed by the plurality of cameras, with each other. Further, the synchronization control unit 46 starts recording of the respective moving pictures from the photographing frames identified by the frame identification unit 45. Furthermore, the synchronization control unit 46 starts the recording of the moving pictures before the photographing frames are identified by the frame identification unit, and trims recording frames before and after the identified photographing frames. Further, the synchronization control unit 46 executes matching control of the trimming of the recording frames, relative to the photographing frames identified by the frame identification unit 45. Furthermore, the synchronization control unit 46 uses the position information of the photographing frames that are identified by the frame identification unit 45, and records or replays the moving pictures so that replay timing of the photographing frames corresponds to each other. Further, the synchronization control unit 46 starts the recording of the respective moving pictures from the photographing frames identified by the frame identification unit 45.

The replay control unit 47 executes control for executing synchronous replay by matching the replay timing of the frames identified by the frame identification unit 45 at the time of the replay.

Further, the replay control unit 47 executes the matching control of the replay timing, relative to the frames identified by the frame identification unit 45.

[Operation]

Next, the operation of the image capturing and replaying control device 1 will be explained.

[Synchronous Photographing Processing]

First, the synchronous photographing processing as a main flow of the operation of the image capturing and replaying control device 1 will be explained.

FIG. 3 is a flowchart showing the flow of the synchronous photographing processing executed by the image capturing and replaying control device 1.

The synchronous photographing processing is executed when the user inputs an instruction to start the synchronous photographing processing.

In a step S11, the specified portion reception unit 41 chooses one synchronization point to be actually synchronized, out of a plurality of synchronization points. In this processing, the specified portion reception unit 41 chooses the synchronization point to be synchronized, out of the plurality of synchronization points, based on the operation of the input unit 16 by the user.

In a step S12, the synchronization control unit 46 transmits/receives time information. In this processing, the synchronization control unit 46 adjusts times of internal clocks of the two cameras via the communication unit 20, prior to the photographing. Not so precise time adjustment is required in this processing. Here, a maximum value of a time lag between the respective cameras is defined as Tm (second).

In a step S13, the synchronization control unit 46 determines the photographing timing of the synchronized moving picture, by transmitting/receiving a shutter signal. The photographing timing determined by the synchronization control unit 46 contains information showing timing of both of the start of photographing and the end of photographing. The information showing the timing of the end of photographing may be transmitted together with the information showing the timing of the start of photographing, before the photographing is started, but may be transmitted at any timing after the photographing is started. The timing is determined by the operation by the user, or determined by automatically judging other conditions.

In a step S14, the synchronization control unit 46 performs the moving picture photographing at the photographing timing determined in the step S13, and records the moving picture data in the storage unit 19. In this processing, the photographing of the moving picture is started by the two cameras, and the photographed moving picture files are stored in the storage units 19. The moving pictures photographed by the respective cameras are referred to as a moving picture 1 and a moving picture 2, respectively.

In a step S15, the synchronization control unit 46 executes the synchronization processing that will be explained later with reference to FIG. 4. When this processing is completed, the synchronous photographing processing is completed.

[Synchronization Processing]

Next, the synchronization processing executed in the step S15 of the synchronous photographing processing will be explained.

FIG. 4 is a flowchart showing the flow of the synchronization processing executed by the image capturing and replaying control device 1. In the synchronous photographing processing, there is a possibility that the two moving pictures, stored in the storage unit 19, have a time lag by Tm (second) at the maximum. When Tm>(1/FPS (Frames Per Second)), that is, when the time lag is expected to extend over a plurality of frames, the following synchronization processing is executed so as to keep the time lag within one frame.

In a step S31, the photographing direction detection unit 43 identifies the photographing direction of its own camera.

In a step S32, the feature point detection unit 44 refers to a timing determination condition table in FIG. 5 and acquires a corresponding timing determination condition, based on the synchronization point chosen in the step S11 of the synchronous photographing processing, and the photographing direction identified in the step S31.

FIG. 5 is a view showing the timing determination condition table stored in the storage unit 19 in FIG. 1. In the timing determination condition table, the timing determination conditions for the respective photographing directions are stored for respective synchronization point candidates.

For example, an explanation will be given to the timing determination condition for the respective photographing directions, when "starting from address position" is chosen as the synchronization point candidate.

In this case, "moving vector of head changes from stopping state to vector A" is set as the timing determination condition of "front (front of body)". Further, "size of head starts to change significantly" is set as the timing determination condition of "rear (side of body)". Furthermore, "condition of correcting vector A in the left by X-degree" is set as the timing determination condition of "oblique X-degree direction". Similarly, the timing determination condition of "oblique Y-degree direction" is set.

Back to FIG. 4 and in a step S33, the synchronization control unit 46 advances the frame position in the moving picture data, recorded in the storage unit 19, by one frame. In this processing, the synchronization control unit 46 advances a replay time of the moving picture data by one frame.

In a step S34, the feature point detection unit 44 identifies a movement of the subject in the current frame position in the recorded moving picture data. The current frame position means the position of the current frame, after its frame position has been advanced by one frame in the step S33.

In this processing, the feature point detection unit 44 first detects the feature point in the image of the recorded moving picture data. Any method may be used by the feature point detection unit 44 to detect the feature point, and, for example, a ROI (Region of interest) area may be automatically detected and the feature point such as an edge may be detected from the area. Then, the feature point detection unit 44 detects a change of the detected feature point in the moving direction. The feature point detection unit 44 detects the change in the moving direction by detecting that the feature point moving to the right slows down, stops for a moment, and starts to move to the left, for example.

In a step S35, the feature point detection unit 44 determines whether the movement of the subject identified in the step S34 satisfies the determination condition acquired in the step S32 or not. When the movement of the subject does not satisfy the acquired determination condition, it is determined as NO in the step S35, and the processing moves back to the step S33. Namely, the processing from the step S33 to the step S35 is repeated by advancing the frame position by one frame, until the determination condition acquired in the step S32 is satisfied. Meanwhile, when the movement of the subject satisfies the acquired determination condition, it is determined as YES in the step S35, and the processing moves to a step S36.

In the step S36, the frame identification unit 45 identifies the current frame position (replay time) in the recorded moving picture data as the synchronization frame (synchronization time).

In a step S37, the synchronization control unit 46 determines the reference camera by transmitting/receiving the signal to/from another camera, via the communication unit 20. The reference camera can be freely determined based on the operation of the input unit 16 by the user and, when one camera is determined as the reference camera, another camera is determined as a camera depending on the reference camera. Incidentally, it is possible to freely change the reference camera at any time, based on the operation of the input unit 16 by the user. When its own camera is determined as the reference camera, it transmits a signal showing that its own camera is the reference camera to another camera. Meanwhile, when another camera is determined as the reference camera, a signal showing that another camera is the reference camera is transmitted from another camera to its own camera, and the reference camera is determined when its own camera receives the signal.

In a step S38, the synchronization control unit 46 determines whether its own camera is the reference camera or not. When its own camera is the reference camera, it is determined as YES in the step S38, and the synchronization processing is completed. Meanwhile, when its own camera is not the reference camera, it is determined as NO in the step S38 and the processing moves to a step S39.

In the step S39, the synchronization control unit 46 calculates a frame difference (time difference) between the synchronization frame (synchronization time) identified in the step S36 and the synchronization frame (synchronization time) of the reference camera. Similarly to the step of its own camera, information on the synchronization frame identified independently in the reference camera is used for the synchronization frame (synchronization time) of the reference camera. In other words, the identification of the synchronization frames is made at the discretion of the respective cameras, according to this embodiment.

In a step S40, the synchronization control unit 46 deletes the frames by the frame difference (time difference×frame rate) calculated in the step S39, from the head of the recorded moving picture data. When this processing is completed, the synchronization processing is completed.

The image capturing and replaying control device 1 according to the first embodiment of the present invention has been explained thus far.

Next, the image capturing and replaying control device 1 according to a second embodiment of the present invention will be explained.

Second Embodiment

The image capturing and replaying control device 1 according to the second embodiment may have the hardware configuration that is basically similar to the image capturing and replaying control device 1 according to the first embodiment. Therefore, the block diagram in FIG. 1 also shows the hardware configuration of the image capturing and replaying control device 1 according to the second embodiment.

Further, the image capturing and replaying control device 1 according to the second embodiment may have the functional configuration that is basically similar to the image capturing and replaying control device 1 according to the first embodiment. Therefore, the image capturing and replaying control device 1 according to the second embodiment executes processing similar to the synchronous photographing processing in FIG. 3 and the synchronization processing in FIG. 4 that are executed by the image capturing and replaying control device 1 according to the first embodiment. Incidentally, the image capturing and replaying control device 1 of the first embodiment executes the processing of deleting the predetermined frames from the head of the moving picture data in the storage unit 19 of its own camera at the discretion of the respective cameras, which is different from the image capturing and replaying control device 1 according to the second embodiment, because the reference camera as the reference collects the moving picture data from another camera, and the reference camera deletes the predetermined frames from the head of the moving picture data as necessary, according to the image capturing and replaying control device 1 of the second embodiment.

Figure 6:
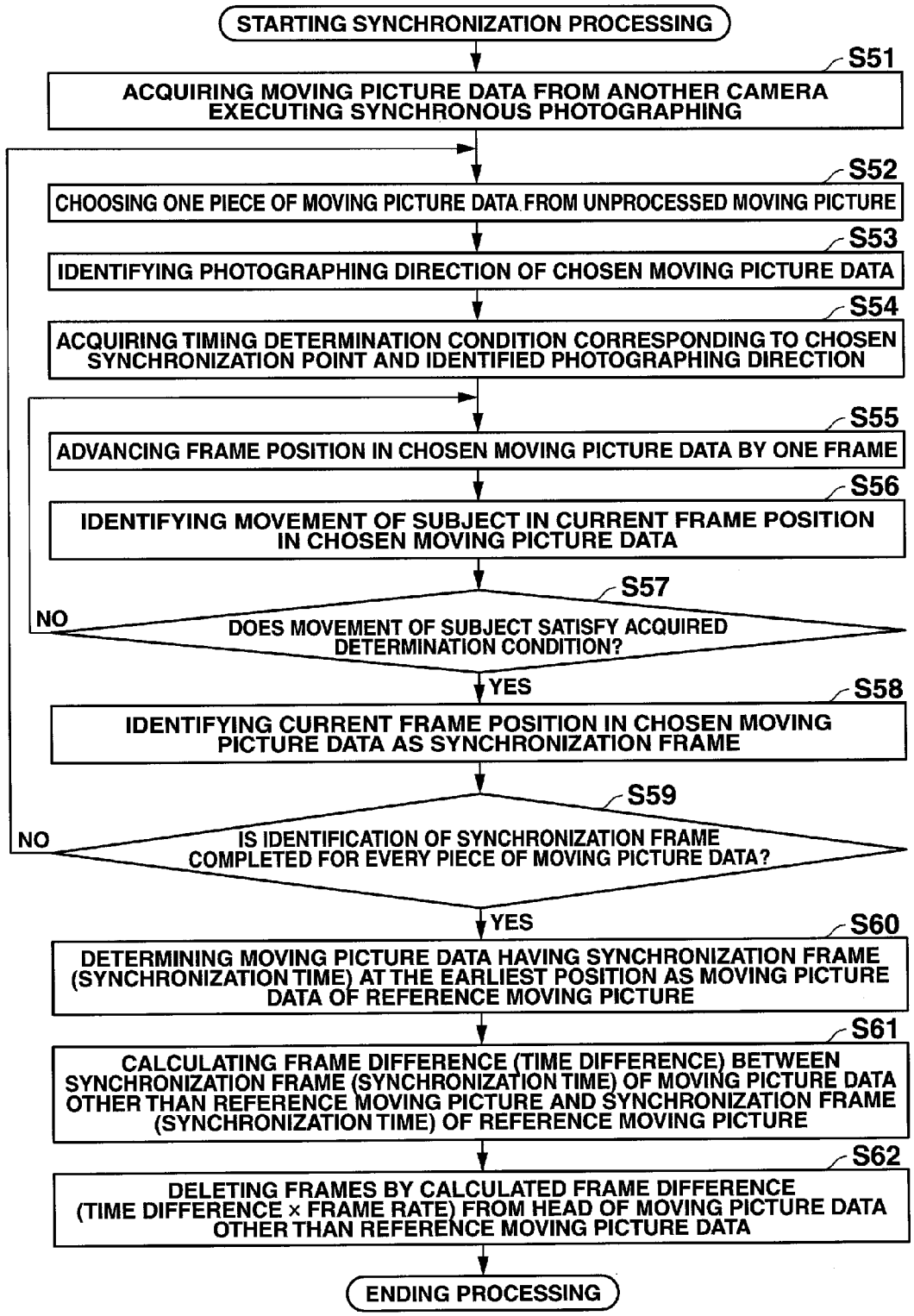
FIG. 6 is a flowchart showing the flow of the synchronization processing executed by the image capturing and replaying control device according to a second embodiment.

Therefore, the image capturing and replaying control device 1 according to the second embodiment employs synchronization processing in FIG. 6, instead of the synchronization processing in FIG. 4. Next, the synchronization processing according to the second embodiment, executed in the step S15 in the synchronous photographing processing, will be explained with reference to FIG. 6.

[Synchronization Processing]

FIG. 6 is a flowchart showing the flow of the synchronization processing according to the second embodiment, executed by the image capturing and replaying control device 1. According to this embodiment, the camera executing the synchronization processing is defined as the reference camera, and the other camera transmitting/receiving the moving picture data and the signal to/from the reference camera is defined as another camera, for explanation purposes. The moving picture photographed by the reference camera is defined as a "moving picture 1", and the moving picture photographed by another camera is defined as a "moving picture 2".

In a step S51, the synchronization control unit 46 acquires the moving picture data from another camera that executes the synchronous photographing, via the communication unit 20.

In a step S52, the synchronization control unit 46 chooses one piece of moving picture data from the unprocessed moving picture data.

In a step S53, the photographing direction detection unit 43 detects and identifies the photographing direction of the moving picture data chosen in the step S52.

In a step S54, the feature point detection unit 44 refers to the timing determination condition table in FIG. 5 and acquires a corresponding timing determination condition, based on the synchronization point chosen in the step S11 of the synchronous photographing processing, and the photographing direction identified in the step S53. The timing determination condition table in FIG. 5 is the same as the timing determination condition table according to the first embodiment, and explanations thereof will be omitted.

In a step S55, the synchronization control unit 46 advances the frame position in the moving picture data, chosen in the step S52, by one frame. In this processing, the synchronization control unit 46 advances the replay time of the moving picture data by one frame.

In a step S56, the feature point detection unit 44 identifies the movement of the subject in the current frame position in the moving picture data that is chosen in the step S52. The current frame position means the position of the current frame, after its frame position has been advanced by one frame in the step S55.

In this processing, the feature point detection unit 44 first detects the feature point in the image of the moving picture data of the chosen moving picture 1. Any method may be used by the feature point detection unit 44 to detect the feature point, and, for example, the ROI area may be automatically detected and the feature point such as the edge may be detected from the area. Then, the feature point detection unit 44 detects the change of the detected feature point in the moving direction. The feature point detection unit 44 detects the change in the moving direction by detecting that the feature point moving to the right slows down, stops for a moment, and starts to move to the left, for example.

In a step S57, the feature point detection unit 44 determines whether the movement of the subject identified in the step S56 satisfies the determination condition acquired in the step S54 or not. When the movement of the subject does not satisfy the acquired determination condition, it is determined as NO in the step S57, and the processing moves back to the step S55. Namely, the processing from the step S55 to the step S57 is repeated by advancing the frame position by one frame, until the determination condition acquired in the step S54 is satisfied. Meanwhile, when the movement of the subject satisfies the acquired determination condition, it is determined as YES in the step S57, and the processing moves to a step S58.

In the step S58, the frame identification unit 45 identifies the current frame position (replay time) in the chosen moving picture data as the synchronization frame (synchronization time). For example, the frame identification unit 45 identifies the current frame position (replay time) in the moving picture data of the moving picture 1 and stores it as a time T1. When detecting the movement of the subject in the moving picture data of another moving picture (moving picture 2, for example), the feature point detection unit 44 identifies the movement of the subject in the frame position near the time T1 in the step S56, so as to quickly identify the movement of the subject. Thus-obtained current frame position (replay time) in the moving picture data of the moving picture 2 is identified and stored as a time T2.

In a step S59, the synchronization control unit 46 determines whether the identification of the synchronization frame in the step S58 is completed for every piece of the moving picture data or not. When the identification of the synchronization frame is not completed, it is determined as NO in the step S58, and the processing moves back to the step S52. Namely, the processing from the step S52 to the step S59 is repeated, until the identification of the synchronization frame is completed for every piece of the moving picture data. Meanwhile, when the identification of the synchronization frame for every piece of the moving picture data is completed, it is determined as YES in the step S59, and the processing moves to a step S60.

In the step S60, the synchronization control unit 46 determines the moving picture data, having the synchronization frame (synchronization time) at the earliest position, as the moving picture data of the reference moving picture.

In a step S61, the synchronization control unit 46 calculates a frame difference D (time difference) between the synchronization frame (synchronization time) of the moving picture data of the moving picture, other than the reference moving picture determined in the step S60, and the synchronization frame (synchronization time) of the reference moving picture.

Here, it is supposed that a time lag between the moving picture 1 and the moving picture 2 is T1−T2. When this is converted into the frame difference D, it is possible for the synchronization control unit 46 to calculate the frame difference D by the following Expression (1).

$$D=(T1-T2)\times FPS \qquad \text{Expression (1)}$$

In a step S62, the synchronization control unit 46 deletes the frames by the frame difference D (time difference×frame rate) calculated in the step S61, from the head of the moving picture data other than the reference moving picture. In this processing, the synchronization control unit 46 deletes the D pieces of the frames by the frame difference D calculated in the step S61, from the head of the moving picture data (moving picture 2, for example) other than the reference moving picture (moving picture 1, for example). When the number D is negative, the synchronization control unit 46 inserts "−D" pieces of the frames to the head of the moving picture data. When this processing is completed, the synchronization processing is completed.

As described thus far, the image capturing and replaying control device 1 according to the embodiments is provided with the feature point detection unit 44, the frame identification unit 45, and the synchronization control unit 46.

The feature point detection unit 44 detects the feature point that commonly exists in the photographing frames of the respective cameras, when the synchronous photographing is executed by the plurality of cameras.

The frame identification unit 45 identifies the positions of the photographing frames, having the same changing state of the feature point detected by the feature point detection unit 44, in the respective cameras.

The synchronization control unit 46 uses the position information of the respective photographing frames that are identified by the frame identification unit 45, and controls to synchronize the plurality of moving pictures, photographed by the plurality of cameras, with each other.

Thus, the plurality of moving pictures can be photographed synchronously, without the need of highly-accurate time synchronization and shutter synchronization at the time of photographing. Therefore, the synchronous photographing can be accurately executed without consideration of an exact delay time in communication, and without support of hardware.

Further, the frame identification unit 45 of the image capturing and replaying control device 1 according to the embodiments identifies the photographing frames, having the same moving direction of the feature point or the same changing state in the moving direction, in the respective cameras. Thus, the synchronous photographing can be executed by determining the photographing frames, having the same moving direction of the feature point or the same changing state in the moving direction, as the frames photographed at the same time.

The synchronization control unit 46 of the image capturing and replaying control device 1 according to the embodiments uses the position information of the respective photographing frames that are identified by the frame identification unit 45, to record or replay the moving pictures so that the replay timing of the photographing frames corresponds to each other. Thus, the synchronous photographing can be executed by determining the photographing frames, having the same frame positions, as the frames photographed at the same time.

The frame identification unit 45 of the image capturing and replaying control device 1 according to the embodiments identifies the photographing frames, having the same changing state of the feature point in the moving direction, in the respective cameras. Thus, the synchronous photographing can be executed by determining the photographing frames, having the same changing state of the feature point in the moving direction, as the frames photographed at the same time.

The synchronization control unit 46 of the image capturing and replaying control device 1 according to the embodiments starts the recording of the respective moving pictures from the photographing frames identified by the frame identification unit 45. Thus, the recording of the moving pictures can be started after the respective cameras are synchronized with each other, by determining the photographing frames, having the same changing state of the feature point in the respective cameras, as the frames photographed at the same time. Therefore, the synchronous photographing can be accurately executed without the support of the hardware.

The synchronization control unit 46 of the image capturing and replaying control device 1 according to the embodiments starts the recording of the moving pictures before the photographing frames are identified by the frame identification unit 45, and trims the recording frames before and after the identified photographing frames. Thus, the synchronous photographing can be substantially made by trimming the recording frames from the moving picture data that is photographed without consideration of the synchronous photographing.

The frame identification unit 45 of the image capturing and replaying control device 1 according to the embodiments detects the common feature point, and identifies the photographing frames having the same changing state, in a plurality of pieces of the moving picture data that are recorded by the synchronous photographing by the plurality of cameras according to any other method. The synchronization control unit 46 executes the matching control of the trimming of the recording frames, relative to the photographing frames identified by the frame identification unit 45.

Thus, the plurality of pieces of the moving picture data, recorded according to various methods, can be photographed synchronously, without the need of the highly-accurate time synchronization and shutter synchronization at the time of photographing. Therefore, the synchronous photographing can be accurately executed without the consideration of the exact delay time in the communication, and without the support of the hardware.

The image capturing and replaying control device 1 according to the embodiments is further provided with the photographing direction detection unit 43. The photographing direction detection unit 43 detects the difference in the photographing directions of the plurality of cameras that execute the synchronous photographing. Then, the frame identification unit 45 identifies the positions of the photographing frames, having the same changing state of the feature point, in the respective cameras, based on the difference in the photographing directions detected by the photographing direction detection unit 43. Thus, the synchronous photographing can be made by determining the photographing frames, having the same changing state of the feature point in the moving direction, as the frames photographed at the same time, while giving consideration to the difference in the photographing directions. Therefore, the synchronous photographing can be executed more accurately, without the support of the hardware.

The photographing direction detection unit 43 of the image capturing and replaying control device 1 according to the embodiments detects the photographing direction of the camera, relative to the direction of the subject. Then, the feature point detection unit 44 determines the moving direction of the feature point to be detected, based on the photographing direction detected by the photographing direction detection unit 43. Thus, the moving direction of the feature point can be determined while giving consideration to the difference in the photographing directions relative to the direction of the subject. Therefore, the synchronous photographing can be executed more accurately, without the support of the hardware.

The image capturing and replaying control device 1 according to the embodiments is further provided with the specified portion reception unit 41. The specified portion reception unit 41 receives the portion of the subject that is freely specified by the user, as the feature point to be detected. Further, the frame identification unit 45 determines the moving direction, along which the portion received by the specified portion reception unit 41 should be detected, based on the detected photographing direction of the camera. Thus, the moving direction to be detected can be determined, based on the portion of the feature point according to the desire of the user. Therefore, the synchronous photographing can be made in keeping with the intention of the user.

The synchronization control unit 46 of the image capturing and replaying control device 1 according to the embodiments starts the recording of the respective moving pictures from the photographing frames identified by the frame identification unit 45. Thus, the respective cameras can start the photographing at the same time, and the synchronous photographing can be executed more accurately.

The image capturing and replaying control device 1 according to the embodiments is further provided with the specified direction reception unit 42. The specified direction reception unit 42 receives the moving direction that is freely specified by the user, as the moving direction of the feature point to be detected. Then, the frame identification unit 45 determines the moving direction of the feature point to be detected by the respective cameras, based on the moving direction received by the specified direction reception unit 42 and the photographing directions of the respective cameras. Thus, the moving direction of the feature point to be detected can be determined, based on moving direction according to the desire of the user and the photographing directions of the cameras. Therefore, the synchronous photographing can be made in keeping with the intention of the user.

The feature point detection unit 44 of the image capturing and replaying control device 1 according to the embodiments detects the feature point, by detecting the light of the LED that is provided at the portion to be detected of the subject. Thus, it is possible to increase the accuracy in detecting the changing state of the feature point of the subject.

The feature point detection unit 44 of the image capturing and replaying control device 1 according to the embodiments detects the light of the LED that flashes at regular intervals as the feature point. Thus, the moving speed of the subject can be calculated with ease, and the accuracy in detecting the changing state of the feature point of the subject can be increased.

The image capturing and replaying control device 1 according to the embodiments is provided with the feature point detection unit 44, the frame identification unit 45, and the replay control unit 47.

The feature point detection unit 44 detects the feature point that commonly exists in the frames of the respective moving pictures, at the time of replaying the plurality of moving pictures synchronously.

The frame identification unit 45 identifies the frames, having the same changing state of the feature point detected by the feature point detection unit 44, in the respective moving pictures.

The replay control unit 47 executes the control for executing the synchronous replay by matching the replay timing of the frames identified by the frame identification unit 45 at the time of replaying.

Thus, the plurality of moving pictures can be photographed synchronously, and then replayed synchronously, without the need of the highly-accurate time synchronization and shutter synchronization at the time of photographing. Therefore, the synchronous replay can be accurately executed without the consideration of the exact delay time in the communication, and without the support of the hardware.

The image capturing and replaying control device 1 according to the embodiments detects the common feature point by the feature point detection unit 44, and identifies the frames having the same changing state by the frame identification unit 45, in the plurality of pieces of the moving picture data that are recorded by the synchronous photographing by the plurality of cameras according to any other method. Then, the replay control unit 47 executes the matching control of the replay timing, relative to the frames identified by the frame identification unit 45. Thus, the moving picture data, in which the plurality of moving pictures are photographed synchronously, can be replayed synchronously, without the need of the highly-accurate time synchronization and shutter synchronization at the time of photographing. Therefore, the synchronous replay can be accurately executed without the consideration of the exact delay time in the communication, and without the support of the hardware.

It should be noted that the present invention is not limited to the above-described embodiments, and modification, improvement and the like capable of achieving the object of the present invention are included in the present invention.

According to the above-described embodiments, the synchronization control unit 46 determines the moving picture data, having the synchronization frame (synchronization time) at the earliest position, as the moving picture data of the reference moving picture, but this is not restrictive. For example, the synchronization control unit 46 can determine the moving picture data chosen based on the operation of the input unit 16 by the user as the moving picture data of the reference moving picture.

Further, according to the above-described embodiments, the synchronization points include the four points ("start from address position", "top", "impact" and "follow"), but this is not restrictive. A plurality of points may be set at will.

Furthermore, according to the above-described embodiments, the image capturing and replaying control device 1, to which the present invention is applied, is explained as the digital camera as an example, but this is not particularly restrictive.

For example, the present invention can be applied to electronic devices in general, having the image processing function. Specifically, the present invention can be applied to, for example, personal computers, television receivers, video cameras, portable navigation devices, mobile phones, portable game devices and the like.

The processing sequence described above can be executed by hardware, and can also be executed by software.

In other words, the hardware configuration shown in FIG. 2 is merely an illustrative example, and the present invention is not particularly limited thereto.

In other words, it is enough when the image capturing and replaying control device 1 is provided with the function of executing the above-described processing sequence in general, and the functional blocks used for realizing this function are not particularly limited to the ones shown in FIG. 2.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Incidentally, it is assumed that system terms as used herein mean general devices formed by a plurality of devices, a plurality of functional parts and the like.

What is claimed is:

1. A moving picture processing device comprising:
a memory; and
a processor,
wherein the memory stores, in advance, a corresponding relationship between predetermined synchronization points in a predetermined movement of a predetermined subject and a timing determination condition which is a condition for detecting a timing of each synchronization point, wherein the timing determination condition includes information of a feature point corresponding to a predetermined portion of the subject and a changing state of the feature point, and wherein the processor executes:
specifying processing to specify an object moving picture;
feature point detection processing to detect, in a frame of the moving picture, a feature point which is stored in the memory in correspondence with a respective one of the predetermined synchronization points;
frame identification processing to identify positions of frames in the moving picture in which frames a changing state of the feature point detected in the feature point detection processing corresponds to a changing state which is stored in the memory in correspondence with the respective one of the predetermined synchronization points; and
control processing to change at least one of the feature point to be detected in the feature point detection processing and the changing state to be used when identifying the positions of the frames in the frame identification processing, according to the feature point and the changing state stored in the memory in correspondence with the respective one of the predetermined synchronization points.

2. The moving picture processing device according to claim 1, wherein the processor further executes:
execution processing to execute a predetermined processing on the moving picture by using position information of a photographing frame identified in the frame identification processing,
wherein the control processing determines the feature point to be detected in the feature point detection processing and the changing state to be used when identifying the positions of the frames in the frame identification processing based on common reference to other moving pictures, so as to synchronize a timing of the predetermined processing, executed in the execution processing, to that of the other moving pictures.

3. The moving picture processing device according to claim 2, wherein, when executing synchronous photographing by a plurality of cameras, the feature point detection processing detects the feature point existing commonly in photographing frames captured by the respective cameras, according to control of the control processing,
wherein the frame identification processing identifies the positions of the photographing frames in which the changing state of the feature point detected in the feature point detection processing is the same for the respective cameras, according to the control of the control processing, and
wherein the execution processing executes photographing processing on the moving picture in synchronization with other cameras, by using the position information of the photographing frames identified in the frame identification processing, according to the control of the control processing.

4. The moving picture processing device according to claim 3, wherein the processor further executes:
photographing direction detection processing to detect a difference in photographing directions of the plurality of cameras executing the synchronous photographing,
wherein the frame identification processing identifies the positions of the photographing frames captured by the respective cameras in which the changing state of the feature point is the same, based on the difference in the photographing directions detected in the photographing direction detection processing, according to the control of the control processing.

5. The moving picture processing device according to claim 4, wherein the photographing direction detection processing detects the photographing directions of the cameras relative to a direction of the subject, and
wherein the feature point detection processing determines a moving direction of the feature point to be detected based on the photographing directions detected in the photographing direction detection processing.

6. The moving picture processing device according to claim 5, wherein the processor further executes:
specified portion reception processing to receive information on the predetermined portion of the subject, which information is freely specified by a user, as the feature point to be detected,
wherein the frame identification processing determines a moving direction, along which the predetermined portion of the subject should be detected, based on the photographing directions detected in the photographing direction detection processing.

7. The moving picture processing device according to claim 3, wherein the processor further executes:
specified direction reception processing to receive a moving direction that is freely specified by a user, as the moving direction of the feature point to be detected,
wherein the frame identification processing determines the moving direction of the feature point to be detected by the respective cameras, based on the moving direction received in the specified direction reception processing and photographing directions of the respective cameras.

8. The moving picture processing device according to claim 2, wherein the execution processing records or replays the moving picture by using position information of the positions of the frames identified in the frame identification processing such that a replay timing of the frames matches a replay timing of other moving pictures, according to the control of the control processing.

9. The moving picture processing device according to claim 8, wherein the execution processing starts recording of the moving picture before the positions of the frames are identified in the frame identification processing, and trims recording frames before and after the identified position of the photographing frame.

10. The moving picture processing device according to claim 8, wherein the control processing starts recording of the respective moving pictures from photographing frames identified in the frame identification processing.

11. The moving picture processing device according to claim 2, wherein the frame identification processing identifies, with respect to a common feature point, positions of photographing frames having a same changing state of the common feature point, in a plurality of pieces of moving picture data that are recorded by synchronous photographing by a plurality of cameras according to any other method, and
wherein the control processing executes matching control with other moving pictures when the execution processing trims recording frames relative to the position information of the photographing frame identified in the frame identification processing.

12. The moving picture processing device according to claim 2, wherein, when executing synchronous replay of a plurality of moving pictures, the feature point detection processing detects the feature point existing commonly in replaying frames of the moving pictures captured by respective cameras, according to control of the control processing,
wherein the frame identification processing identifies the positions of the replaying frames in which the changing state of the feature point detected in the feature point detection processing is the same for the respective moving pictures, according to the control of the control processing, and
wherein the execution processing executes replay processing on the moving picture in synchronization with other moving pictures, by using the position information of the replaying frames identified in the frame identification processing, according to the control of the control processing.

13. The moving picture processing device according to claim 12, wherein a common feature point is detected in the feature point detection processing, and frames having a same changing state are identified in the frame identification processing, in a plurality of pieces of moving picture data that are recorded by synchronous photographing by a plurality of cameras according to any other method, and
wherein the execution processing executes matching control of a replay timing with other moving pictures, relative to the positions of the frames identified in the frame identification processing, according to the control of the control processing.

14. The moving picture processing device according to claim 1, wherein the frame identification processing identifies the positions of the frames in which a moving direction of the feature point or a changing state of the moving direction corresponds to the changing state which is stored in the memory in correspondence with the respective one of the predetermined synchronization points.

15. The moving picture processing device according to claim 1, wherein the feature point detection processing detects the feature point by detecting light of an LED that is provided at the predetermined portion of the subject to be detected.

16. The moving picture processing device according to claim 15, wherein the feature point detection processing detects the light of the LED, that flashes at regular intervals, as the feature point.

17. The moving picture processing device according to claim 1, wherein the control processing changes the feature point to be detected in the feature point detection processing and the changing state to be used when identifying the positions of the frames in the frame identification processing according to a difference of a timing to be detected in the predetermined movement and a difference in photographing directions relative to a direction of the subject.

18. A moving picture processing method executed by a moving picture processing device having a memory and a processor, the memory storing in advance a corresponding relationship between predetermined synchronization points in a predetermined movement of a predetermined subject and a timing determination condition which is a condition for detecting a timing of each synchronization point, wherein the timing determination condition includes information of a feature point corresponding to a predetermined portion of the subject and a changing state of the feature point, the method comprising:
operating the processor to execute:
specifying processing to specify an object moving picture;
feature point detection processing to detect, in a frame of the moving picture, a feature point which is stored in the memory in correspondence with a respective one of the predetermined synchronization points;
frame identification processing to identify positions of frames in the moving picture in which frames a changing state of the feature point detected in the feature point detection processing corresponds to a changing state which is stored in the memory in correspondence with the respective one of the predetermined synchronization points; and
control processing to change at least one of the feature point to be detected in the feature point detection processing and the changing state to be used when identifying the positions of the frames in the frame identification processing, according to the feature point and the changing state stored in the memory in correspondence with the respective one of the predetermined synchronization points.

19. A non-transitory computer-readable storage medium having a program stored thereon that controls a processor of a moving picture processing device, the moving picture processing device further including a memory that stores, in advance, a corresponding relationship between predetermined synchronization points in a predetermined movement of a predetermined subject and a timing determination condition which is a condition for detecting a timing of each synchronization point, the timing determination condition including information of a feature point corresponding to a predetermined portion of the subject and a changing state of the feature point, and the program being executable to control the processor to execute:
specifying processing to specify an object moving picture;
feature point detection processing to detect, in a frame of the moving picture, a feature point which is stored in the memory in correspondence with a respective one of the predetermined synchronization points;
frame identification processing to identify positions of frames in the moving picture in which frames a changing state of the feature point detected in the feature point detection processing corresponds to a changing state which is stored in the memory in correspondence with the respective one of the predetermined synchronization points; and
control processing to change at least one of the feature point to be detected in the feature point detection processing and the changing state to be used when identifying the positions of the frames in the frame identification processing, according to the feature point and the changing state stored in the memory in correspondence with the respective one of the predetermined synchronization points.

* * * * *